Figure 1:
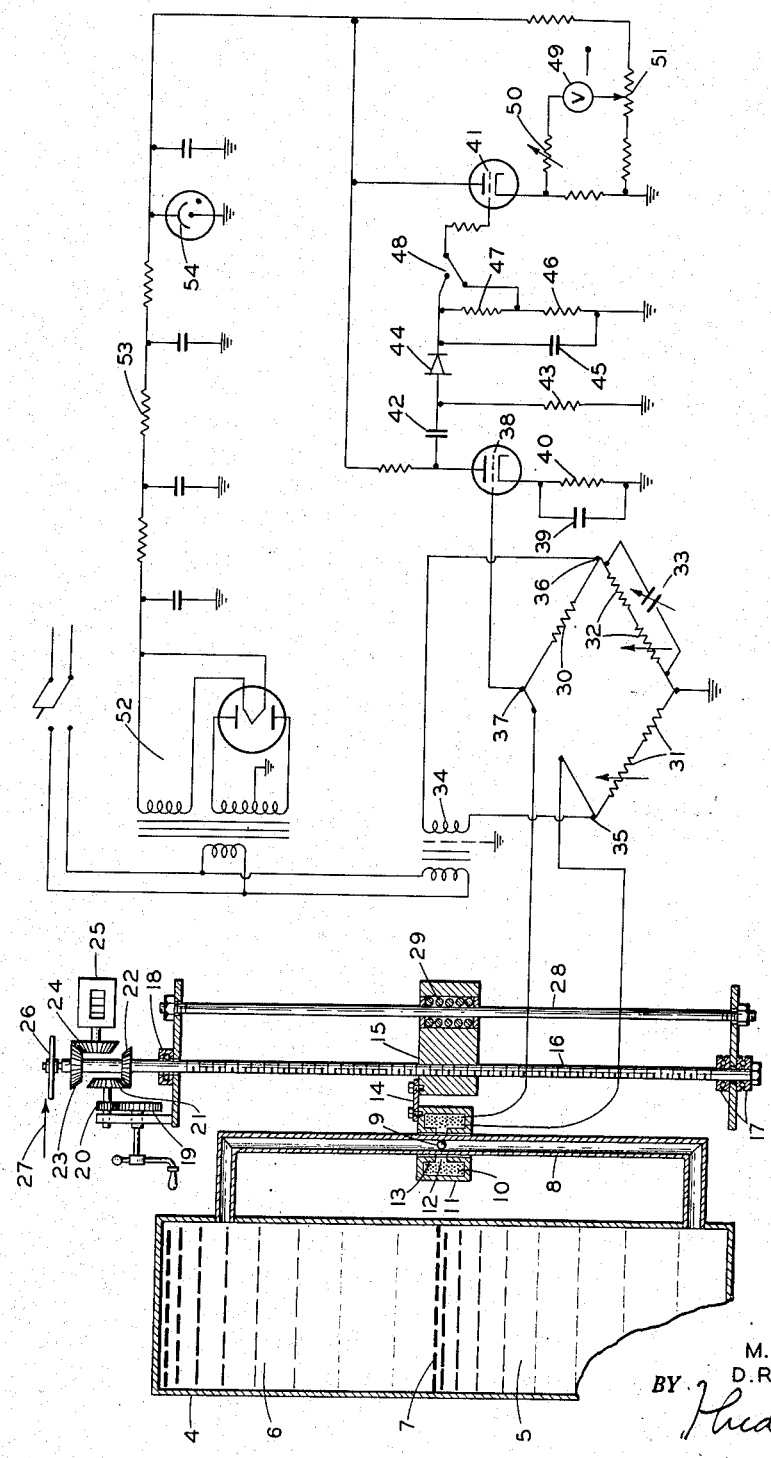

Nov. 24, 1953

M. R. DEAN ET AL 2,660,059

LIQUID LEVEL MEASURING APPARATUS

Filed Jan. 4, 1950

2 Sheets-Sheet 1

FIG. I

INVENTORS
M.R. DEAN
D.R. DE BOISBLANC
BY Hudson & Young
ATTORNEYS

Nov. 24, 1953  M. R. DEAN ET AL  2,660,059
LIQUID LEVEL MEASURING APPARATUS
Filed Jan. 4, 1950  2 Sheets-Sheet 2

INVENTORS
M.R. DEAN
D. R. DE BOISBLANC
BY
ATTORNEYS

Patented Nov. 24, 1953

2,660,059

UNITED STATES PATENT OFFICE 2,660,059

LIQUID LEVEL MEASURING APPARATUS

Maurice R. Dean and Deslonde R. de Boisblanc, Bartlesville, Okla., assignors to Phillips Petroleum Company, a corporation of Delaware Application January 4, 1950, Serial No. 136,738

15 Claims. (Cl. 73—313)

This invention relates to an apparatus for determining the location of an interface between two bodies of fluids. In one of its aspects, this invention relates to an apparatus for measuring the depth of a body of fluid.

In many instances, it is necessary to determine the location of an interface between two adjacent bodies of fluids. For example, many settling systems have been employed to separate a mixture of two immiscible fluids into its compounds. In operating such a settling system, the two fluids usually separate into two bodies of fluids, one superposed upon the other with a so-called "interface" defining the boundary line between the two fluids. Generally, it is necessary to locate the interface between the two fluids in order to control the depth of the lower body of fluid. Although the location of such an interface can usually be determined by visual inspection, the determination of its exact position thereby is subject to the inaccuracies and inconsistencies of individual judgment. Further, when the fluids forming the interface are contained in an opaque vessel, visual observation is obviously impossible and resort must be had to an artificial means for locating the interface between the two fluids. Although many means have been devised for determining such a location, various disadvantages are met in their employment. Thus, many of these means employ a mechanical linkage extending through the wall of the vessel containing the fluids and hence are subject to leaks through the openings in the vessel accommodating such linkages. Other means are inaccurate and cannot be relied upon to yield consistent determinations of the location of an interface.

It has now been found that an interface between two fluids, such as an interface between two liquids or one between a gas and a liquid, can be readily located by employing a float adapted to float at the interface between the fluids and an electrical means for determining the position of the float. It has been found that an inductance coil having a metallic casing with an air gap can be employed to accurately locate the float by comparing the flux density in the casing when the float is centered in the air gap with the flux density when the float is removed from the air gap. It has been found that the flux density in the casing increases rapidly to a maximum as the float becomes centered in the air gap and that any movement of the float away from the center of the air gap sharply decreases the flux density in the metallic casing around the coil. Therefore, by providing a float adapted to float at the interface between two fluids and by providing an inductance coil having a metallic casing with an air gap and adapted to be moved upwardly and downwardly around the float until a maximum flux density is detected in the metallic casing, the position of the encased inductance coil will accurately determine the position of the float even though the latter is positioned within an opaque vessel.

It is an object of this invention to provide an apparatus for accurately determining the location of an interface between two bodies of fluids.

Another object of this invention is to provide an apparatus for locating an interface between two bodies of fluids and to thereby determine the depth of at least one of the bodies of fluids.

Still another object of this invention is to provide an apparatus particularly adapted to determine the location of an interface between two bodies of fluids contained in a vessel, without employing any operating linkages extending through the walls of that vessel.

Yet another object of this invention is to provide a simple apparatus for accurately determining the location of an interface between two bodies of fluids situated in an opaque vessel.

Other objects of this invention will be apparent to one skilled in the art upon reading the disclosure and claims to the invention.

Figure 2:
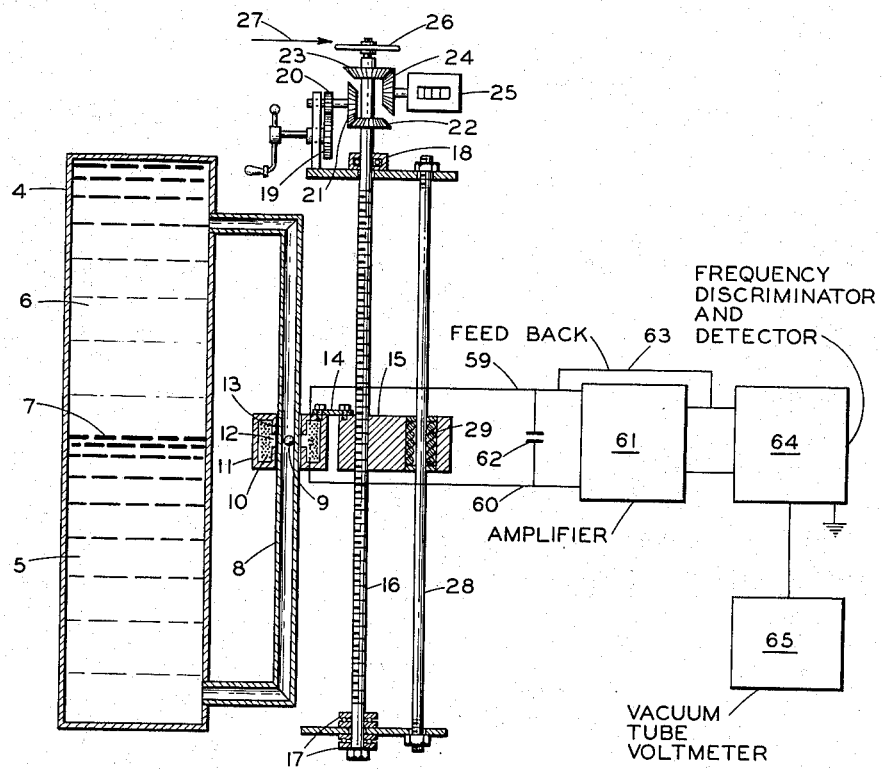
Figure 3:
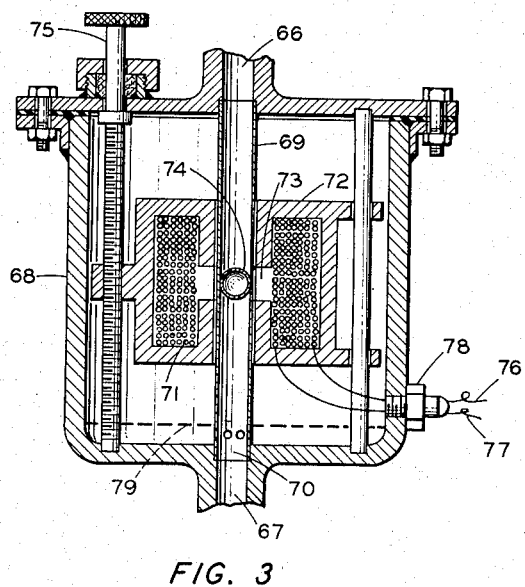

The accompanying drawings illustrate several embodiments of this invention. Figures 1 and 2 represent two embodiments of this invention as employed to determine the interface between two fluids contained in a vessel having opaque walls and Figure 3 represents an embodiment specifically adapted for use to determine the interface between two bodies of liquids maintained in a vessel of high pressure.

In Figure 1, vessel 4 contains a lower body of fluid 5 and an upper body of fluid 6 which form an interface 7 which it is desired to locate. Attached to vessel 4 is a vertical conduit 8 connected at its ends to vessel 4 so as to communicate with the bodies of fluids 5 and 6, respectively. In accordance with the laws of fluid dynamics, fluids 5 and 6 will flow into conduit 8 to establish an interface therein corresponding in height to that of interface 7 in vessel 4. Conduit 8 can be a tube and should be constructed from a material having substantially non-magnetic characteristics such as aluminum, stainless steel, various well-known plastic materials, etc. A float 9 is situated in conduit 8. Float 9 can be a hollow sphere and constructed so that its displacement will permit it to sink in fluid 6 and yet float on the surface of fluid 5 in such a manner it will come to rest at the interface between the two bodies of fluid. Adjustment of the external diameter of the float and the thickness of its walls with respect to the density of the material from which it is constructed as well as the densities of the fluids forming the interface can readily be accomplished so that the float will perform its desired function. However, the internal diameter of conduit 8 and the external diameter of float 9 should be adjusted so that float 9 can have a minimum of lateral movement in conduit 8. Float 9 should be constructed of a metal having a relatively high magnetic permeability. Among such materials are the various steels, iron, iron and nickel alloys, etc.

Surrounding conduit 8 is an inductance coil 10 having a casing 11. Casing 11 should be constructed from a metal having a relatively high permeability as in float 9. The casing is formed to have an air gap 12 in its inner wall 13 adjacent to conduit 8. Air gap 12 can be angular in shape so that it extends entirely around conduit 8 or it can be a plurality of holes having their centers spaced around conduit 8 in a plane perpendicular to the longitudinal axis of conduit 8. The vertical depth of air gap 12 should be approximately equal to the diameter of float 9 although if made smaller or larger, results of lesser value will be obtained. Casing 11 has an internal diameter such that it can be moved upwardly and downwardly along conduit 8 and yet fit relatively close to conduit 8.

Attached to casing 11 of coil 10 by means of plate 14 is a guide block 15. Guide block 15 is tapped and threaded to receive a rotatable, threaded rod 16. Rod 16 is supported at one end by bearing 17 and at the other by bearing 18. A rotating mechanism having drive gears 19 and 20 and bevel gears 21 and 22 is attached to one end of rod 16. Bevel gears 23 and 24 can also be attached to rod 16 to drive a counting mechanism 25. A dial 26 having a fixed indicator 27 is also attached to rod 16. Dial 26 can be calibrated in degrees to indicate the extent of rotation of rod 16 or it can be calibrated directly in feet and/or inches, etc.

A guide rod 28 is situated parallel to threaded rod 16 and passes through slip bearing 29 in guide block 15 in order to maintain coil 10 and its casing 11 centered about conduit 8 and to prevent casing 11 from binding on rod 8 and to further prevent the threads in guide block 15 from becoming misaligned with the threads on threaded rod 16.

A detecting unit comprising an unbalanced-type impedance bridge and an unbalance measuring means is connected to the ends of coil 10 as shown in Figure 1. The impedance bridge is comprised of four impedances generally designated as 30, 31 and 32 and coil 10. The impedances have been shown as resistances in the drawing although it is apparent that bridges having other components arranged in the same or different manner can be employed. Impedance 32 has a variable capacitance 33 connected in parallel and impedance 32 can be adjusted to balance any phase changes occurring in the bridge.

An alternating current source for the impedance bridge is provided by transformer 34 which is connected to input terminals 35 and 36 of the impedance bridge as shown. Any other suitable source of alternating current can obviously be provided.

Output terminal 37 of the impedance bridge is connected to an amplifying vacuum tube 38 as shown. The cathode of tube 38 is biased by the self bias method with by-pass condenser 39 and resistor 40. The output of amplifier tube 38 is coupled to tube 41 by means of condenser 42 and resistor 43. A rectifier 44 is located in the output from tube 38 as shown. Although a crystal rectifier (e. g. germanium diode) has been shown, it is obvious that other rectifiers such as any suitable diode can be employed. A filter circuit comprising by-pass condenser 45 and resistors 46 and 47 are provided to smooth the alternating current ripple from the output of tube 38. Selective switch 48 can be provided to place resistor 47 in series with crystal 44 so that the magnitude of the output from tube 38 can be adjusted.

A voltmeter 49 is connected through variable resistor 50 to the cathode of tube 41 and through potentiometer 51 to the plate of tube 41.

A power supply can be provided to furnish energy to tubes 38 and 41 from the same alternating current source as the power supplied to the impedance bridge. In Figure 1, a full-wave rectifier circuit 52 is connected to a resistance-capacity filter designated generally at 53 and has a gas-filled tube voltage regulator 54 connected to the output thereof. Other types of power supplies can be substituted for that shown. For example, a choke-input or a capacitance input filter can be employed in conjunction with either the rectifier shown or with other types such as a bridge rectifier.

In operation, float 9 in conduit 8 will rise or fall until it rests at the interface between fluids 5 and 6 at a level corresponding to interface 7 in vessel 4. Coil 10 is then moved to a position on conduit 8 such that float 9 is not within casing 11, by turning gear 19 which in turn rotates gears 20, 21 and 22 and threaded rod 16 thereby raising or lowering guide block 15 and coil 10. The impedance bridge is then balanced by adjusting impedance 31 to give a minimum reading on voltmeter 49. In so doing, the signal from output terminal 37 of the impedance bridge is amplified in tube 38. The amplified signal is then rectified in rectifier 44 to yield a direct current. This current is then applied to tube 41 and the amount of current flowing in the plate circuit of this tube is measured by voltmeter 49. Variable resistor 50 and potentiometer 51 can be regulated to adjust the scale reading of voltmeter 49 at "zero" or any other desired point when the impedance bridge is balanced.

After the impedance bridge is balanced, gear 19 is rotated to raise or lower coil 10 along conduit 8 until a maximum reading is noted on voltmeter 49. At this position, coil 10 will be situated with air gap 12 centered about float 9. Float 9 will then cause an increase in the flux density in casing 11 with a resultant increase in the inductance of coil 10. This increased inductance causes the impedance bridge to become unbalanced and the amount of such unbalance is reflected in the signal sent to tube 38. After amplification in tube 38 and rectification by crystal 44 in the cathode-anode circuit of tube 41, the strength of the resulting signal is measured by voltmeter 49.

When the bridge is at maximum unbalance, the height of coil 10 can be determined from counter 25 and dial 26. Thus counter 25 indicates the number of revolutions rod 16 has made in elevating coil 10 to a position centered around float 9 while dial 26 indicates the fractional part of a turn, if any. Addition of these two readings will indicate the position of coil 10. Counter 25 and dial 26 can be calibrated directly in feet and inches about any desired datum plane.

In Figure 2, vessel 4 and its contents, conduit 8, float 9, coil 10, casing 11 and air gap 12 all correspond in construction and function to like-numbered parts in Figure 1. However, in Figure 2, the ends of coil 10 are not connected to an impedance bridge as in Figure 1 but are connected to an alternative circuit likewise adapted to measure the change in impedance in coil 10 as caused by variations in position of float 9 with respect to air gap 12. As shown, the ends 59 and 60 of coil 10 are connected to a feedback amplifier 61 and have a condenser 62 connected therebetween to be in parallel with coil 10. Coil 10 and condenser 62 form a tuned tank circuit, the frequency of which varies with the reactance of coil 10. The reactance of coil 10, in turn, is determined by the position of float 9 with respect to air gap 12. Amplifier 61 contains a vacuum tube (not shown) connected with the tank circuit to form an oscillator having a feedback 63. The resulting frequency modulated signal generated as a result of movement of float 9 with respect to air gap 12 is sent to a frequency discriminator 64 whose output voltage is measured by a vacuum tube voltmeter 65.

In operation, coil 10 and casing 11 are moved upwardly and downwardly until voltmeter 65 exhibits a maximum reading. When this happens, float 9 is centered in air gap 12 and the depth of a body of liquid in vessel 4 can be readily determined as explained with reference to Figure 1.

Figure 3, illustrates an embodiment of conduit 8 and coil 10 of Figures 1 and 2 which is especially adapted for use to determine the interface between two bodies of liquids maintained in a vessel under high pressures. Although it is possible to use the embodiment of Figure 1 when a high pressure exists in vessel 4, it is obvious that the thickness of the walls of conduit 8 must be increased to withstand the high internal pressure and that such an increased thickness will decrease the sensitivity of coil 10 in locating float 9. The embodiment shown in Figure 3, however, can be employed under any pressure without affecting the sensitivity of the determination of the interface float.

In Figure 3, conduits 66 and 67 are adapted to be connected to a vessel containing fluids forming an interface therein similarly to Figures 1 and 2 so that the fluids will flow through conduits 66 and 67 to form a corresponding interface in housing 68 and tube 69. Tube 69 extends across housing 68 between the inlets of conduits 66 and 67 and can have walls of any thickness regardless of the pressure existing in housing 68. Tube 69 should be constructed of a non-magnetic metallic or a non-metallic material similar to that employed in conduit 8 in Figures 1 and 2. At least one and preferably several holes 70 are provided in tube 69 to equalize the pressure across the walls of tube 69 thereby permitting housing 68 to withstand the pressure transmitted through conduits 66 and 67.

Surrounding tube 69 is a coil 71 having a casing 72 and an air gap 73 similar to coil 10, casing 11 and air gap 12 of Figures 1 and 2. Casing 72 should be constructed of a magnetic material such as steel and its air gap 73 can be annular around tube 69 or comprise a series of holes situated with their axes in a plane perpendicular to tube 69. The vertical depth of air gap 73 preferably is the same as the diameter of float 74 in order to achieve the greatest change in flux density in casing 72 when float 74 is centered in air gap 73 of casing 72. Casing 72 is provided with a screw 75 adapted to raise and lower it along tube 69. The ends 76 and 77 of coil 71 can extend through housing 68 via packing gland 78 and are then connected to an impedance bridge (not shown) as in Figure 1 or a feedback amplifier-frequency discriminator circuit as in Figure 2.

In operation, coil 71 and its casing 72 can be raised and lowered along tube 69 by means of screw 75 to determine the location of float 74 in much the same manner as described with reference to Figures 1 and 2. Screw 75 can be calibrated to read directly the position of float 74 about any desired datum plane.

In many instances, it may be desirable to employ the embodiment of Figure 3 in a system containing a fluid which is electrically conductive and which would tend to short-circuit coil 71 if permitted to contact therewith. For example, the fluid entering conduit 67 could be mercury or water while the fluid entering conduit 66 could be an oil. In such case, it is desirable to partially fill housing 68 with the oil so that the heavier fluid e. g. water or mercury, entering through conduit 67 will flow through holes 70 and form an interface 79 with the oil already in housing 68 which interface is substantially below the operative position of coil 71. The volumetric capacity of housing 68 can be made sufficiently large relative to that of tube 69 to permit wide variations in the level of float 74 with only a relatively slight variation in level of interface 79.

In employing the apparatus of this invention to determine the interface between two bodies of fluids, it has been found that the position of a float situated at the interface can be determined with an accuracy of the order of 0.001 inch when the float has a diameter of about one-fourth inch and the air gap in the surrounding casing is one-fourth inch. It is obvious that such a high degree of accuracy fits the apparatus of this invention especially for employment in experimental procedures demanding the ultimate degree of accuracy. However, such accuracy may not be desirable when employing the apparatus in commercially operating installations. In such instances, the sensitivity of the apparatus can be lessened and varied by increasing the vertical depth of the air gap in the casing surrounding the inductive coil to provide a space for the float to rise and fall without any great change in flux density in the casing. Thus, the accuracy of the apparatus can be controlled by varying the vertical depth of the air gap.

It is obvious that the coil and its casing can be raised and lowered automatically by means of such devices as a reversible motor operatively connected therewith and responding to an impulse from the detecting circuits associated with the coil. Thus, the apparatus can be adapted to automatically record the interface level between any two adjacent bodies of fluids.

While the invention has been described in connection with a present, preferred embodiment thereof, it is to be understood that this description is illustrative only and is not intended to limit the invention, the scope of which is defined by the appended claims.

We claim:

1. An apparatus for determining the location of an interface between two bodies of fluids comprising, in combination, a vertical non-magnetic conduit having its lower end connected with the lower one of said bodies of fluid and its upper end connected with the upper one of said bodies of fluid so that an interface will be formed in said conduit; a hollow spherical float situated in said conduit, said float being formed of a magnetizable material in such a fashion that its displacement will cause it to float at the said interface; an inductance coil surrounding said conduit, a magnetizable metal casing enclosing said coil so as to separate it from said conduit, said casing being formed so as to have the ends of the wall of said casing adjacent said conduit extending axially into each end of the coil so as to form an annular air gap in said casing adjacent said conduit, said air gap having a vertical depth equal to the diameter of said float; an impedance bridge connected to said coil in such a manner that said coil forms a variable impedance in said bridge and a micrometer screw means operatively connected to said casing to raise and lower said coil and said casing along said conduit.

2. An apparatus for determining the location of an interface between two bodies of fluids comprising, in combination, a non-magnetic conduit having its lower end connected with the lower one of said bodies of fluid and its upper end connected with the upper end of said bodies of fluid so that an interface will be formed in said conduit; a float situated in said conduit, said float being formed of a magnetizable material in such a fashion that its displacement will cause it to float at the said interface; an inductance coil surrounding said conduit; a magnetizable metal casing enclosing said coil, said casing being formed to have an opening therein coaxial to the longitudinal axis of said coil and adapted to receive said conduit, said casing having at least one opening therein adjacent said conduit and equal in vertical depth to the vertical dimension of said float; a detecting means connected to said coil and adapted to determine variations in inductance of said coil caused by changes in position of said float with respect to said air gap in said casing; and a micrometer screw means operatively connected to said casing so as to raise and lower said coil and said casing along said conduit.

3. The apparatus of claim 2 wherein said detecting means is an impedance bridge connected to said coil so that said coil forms the unknown impedance in said bridge.

4. The apparatus of claim 2 wherein said detecting means comprises a condenser connected in parallel to said coil to form a tuned tank circuit, an amplifier having a vacuum tube and a feed back circuit associated therewith to form an oscillator with said tank circuit, a frequency discriminator connected to said amplifier and a vacuum tube voltmeter connected to said frequency discriminator to measure the output thereof.

5. An apparatus for determining the location of an interface between two bodies of fluids comprising, in combination, a non-magnetic conduit having its end connected with said bodies of said fluid so that an interface will be formed; a float situated in said conduit, said float being formed of a magnetizable material in such a fashion that its displacement will cause it to float at the said interface; an inductance coil surrounding said conduit; a magnetizable casing enclosing said coil; said casing being adapted to slidably receive said conduit therethrough and having therein at least one air gap, equal to the vertical dimension of said float, situated adjacent to said tube; a detecting means associated with said coil to measure the impedance thereof; and means to raise and lower said coil and said casing along said conduit.

6. An apparatus for determining the location of an interface between two bodies of fluids comprising, in combination, a conduit having its ends connected with said bodies of fluid so that an interface will be formed in said conduit; a magnetizable float situated in said conduit, said float being formed in such a fashion that its displacement will cause it to float at the said interface; an inductance coil enclosed in a casing having at least one air gap equal to the vertical dimension of said float, adjacent to and surrounding said conduit; a detecting means associated with said coil and adapted to measure the impedance thereof; and means to raise and lower said coil and casing.

7. An apparatus for determining the location of an interface between two bodies of fluids comprising, in combination, a magnetizable float adapted to float at the said interface; an inductance coil enclosed in a casing having at least one air gap equal to the vertical dimension of said float adjacent to and surrounding said float; a detecting means associated with said coil and adapted to indicate changes in impedance thereof; and means to raise and lower said inductance coil and casing.

8. An apparatus adapted to determine the location of an interface between two adjacent bodies of fluids which comprises, in combination, a non-magnetic hollow cylindrical housing; a non-magnetic conduit connecting the upper portion of said housing to the upper body of said fluid; a conduit connecting the lower portion of said housing with the lower body of said fluid; a thin-walled non-magnetic tube extending vertically across said housing to connect the openings of said conduits into said housing, said tube having at least one hole through the wall thereof; a hollow spherical float situated in said tube and adapted to float on one of said fluids and sink in the other; an inductance coil surrounding said tube; a magnetizable casing enclosing said coil and having at least one opening therethrough coaxial with the enclosing longitudinal axis of said coil and adapted to permit said casing and coil to move upwardly and downwardly along said tube, said casing having an annular air gap in the wall forming said annular opening, the vertical depth of said air gap being equal to the diameter of said float, a detecting unit connected to said coil and adapted to determine variations in inductance of said coil caused by changes in position of said float with respect to said air gap in said casing; and a screw means associated with said casing to lower and raise it along said tube.

9. An apparatus adapted to determine the location of an interface between two adjacent bodies of fluids which comprises, in combination, a cylindrical housing; conduits connecting said housing with each of said bodies of fluid so that an interface will be formed therein; a non-magnetic tube extending across said housing to connect the openings of said conduits into said housing said tube having at least one hole through the wall thereof; a float situated in said tube and adapted to float on one of said fluids and sink in the other; an inductance coil surrounding said tube, a magnetizable casing forming an enclosing wall around said coil separating said coil from said tube and adapted to permit said casing and coil to move upwardly and downwardly along said tube, said casing wall having an air gap therethrough adjacent to said tube the vertical depth of said air gap being equal to the vertical dimension of said float; a detecting means connected to said coil and adapted to determine variations in inductance of said coil caused by changes in position of said float with respect to said air gap in said casing; and means to raise and lower said coil and casing.

10. The apparatus of claim 9 wherein said detecting means is an impedance bridge connected to said coil so that said coil forms the unknown impedance in said bridge.

11. The apparatus of claim 9 wherein said detecting means comprises a condenser connected to said coil to form a tuned tank circuit, an amplifier having a vacuum tube and a feed back circuit associated therewith to form an oscillator with said tank circuit, a frequency discriminator connected to said amplifier and a vacuum tube voltmeter connected to said frequency discriminator to measure the output thereof.

12. An apparatus adapted to determine the location of an interface between two adjacent bodies of fluids which comprises, in combination, a hollow cylindrical housing; conduits connecting said housing with each of said bodies of fluid so that an interface will be formed therein; a tube extending across said housing to connect the openings of said conduits into said housing; a float situated in said tube and adapted to float on one of said fluids and sink in the other; an inductance coil surrounding said tube; a casing forming a wall enclosing said coil and adapted to permit said casing and coil to move upwardly and downwardly along said tube, said casing wall having an air gap therein the vertical depth of said air gap being equal to the vertical dimension of said float adacent to said tube; a detecting means connected to said coil and adapted to determine variations in inductance of said coil caused by changes in position of said float with respect to said air gap in said casing; and means to raise and lower said casing and coil.

13. An apparatus adapted to determine the location of an interface between two bodies of fluids which comprises, in combination, a hollow housing; conduits connecting said housing with said bodies of fluid so that an interface will be formed therein; a tube extending across said housing between the openings of said conduits into said housing; a float situated in said tube and adapted to float on one of said fluids and sink in the other; an inductance coil having a casing surrounding said tube, said casing forming a wall enclosing said coil and having an air gap through the wall adjacent said tube equal in vertical height to the vertical dimension of said float; a detecting means connected to said coil and adapted to determine variations in inductance of said coil caused by changes in position of said float with respect to said air gap in said casing; and means to raise and lower said casing and coil.

14. The apparatus of claim 13 wherein said detecting means is an impedance bridge connected to said coil so that said coil forms the unknown impedance in said bridge.

15. The apparatus of claim 13 wherein said detecting means comprises a condenser connected to said coil to form a tuned tank circuit, an amplifier having a vacuum tube and a feed back circuit associated therewith to form an oscillator with said tank circuit, a frequency discriminator connected to said amplifier and a vacuum tube voltmeter connected to said frequency discriminator to measure the output thereof.

MAURICE R. DEAN.
DESLONDE R. DE BOISBLANC.

References Cited in the file of this patent

UNITED STATES PATENTS

| Number | Name | Date |
|---|---|---|
| 727,779 | Frieseke | May 12, 1903 |
| 2,337,608 | Hulsberg | Dec. 28, 1943 |
| 2,339,922 | Gatewood | Jan. 25, 1944 |
| 2,357,745 | Kliever | Sept. 5, 1944 |

FOREIGN PATENTS

| Number | Country | Date |
|---|---|---|
| 820,993 | France | Aug. 17, 1937 |
| 846,460 | France | June 5, 1939 |